Figure 1:
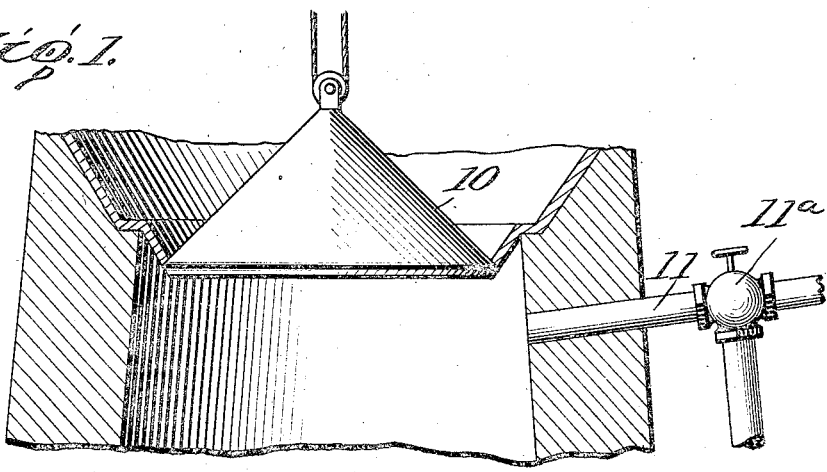
Figure 1:
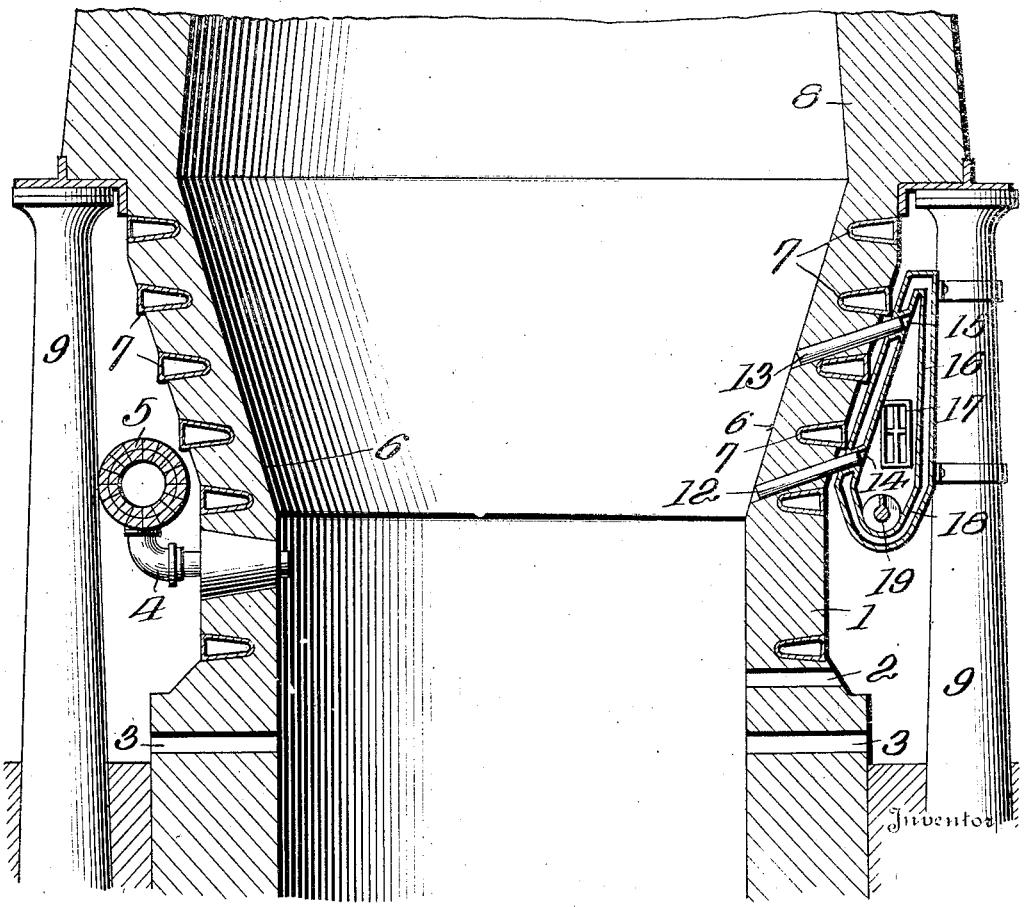

Aug. 28, 1923.

K. P. McELROY 1,466,626

PRODUCTION OF AMMONIA AND SALTS OF CERTAIN CARBON ACIDS

Filed July 8, 1921 2 Sheets-Sheet 1

Inventor

By K. P. McElroy

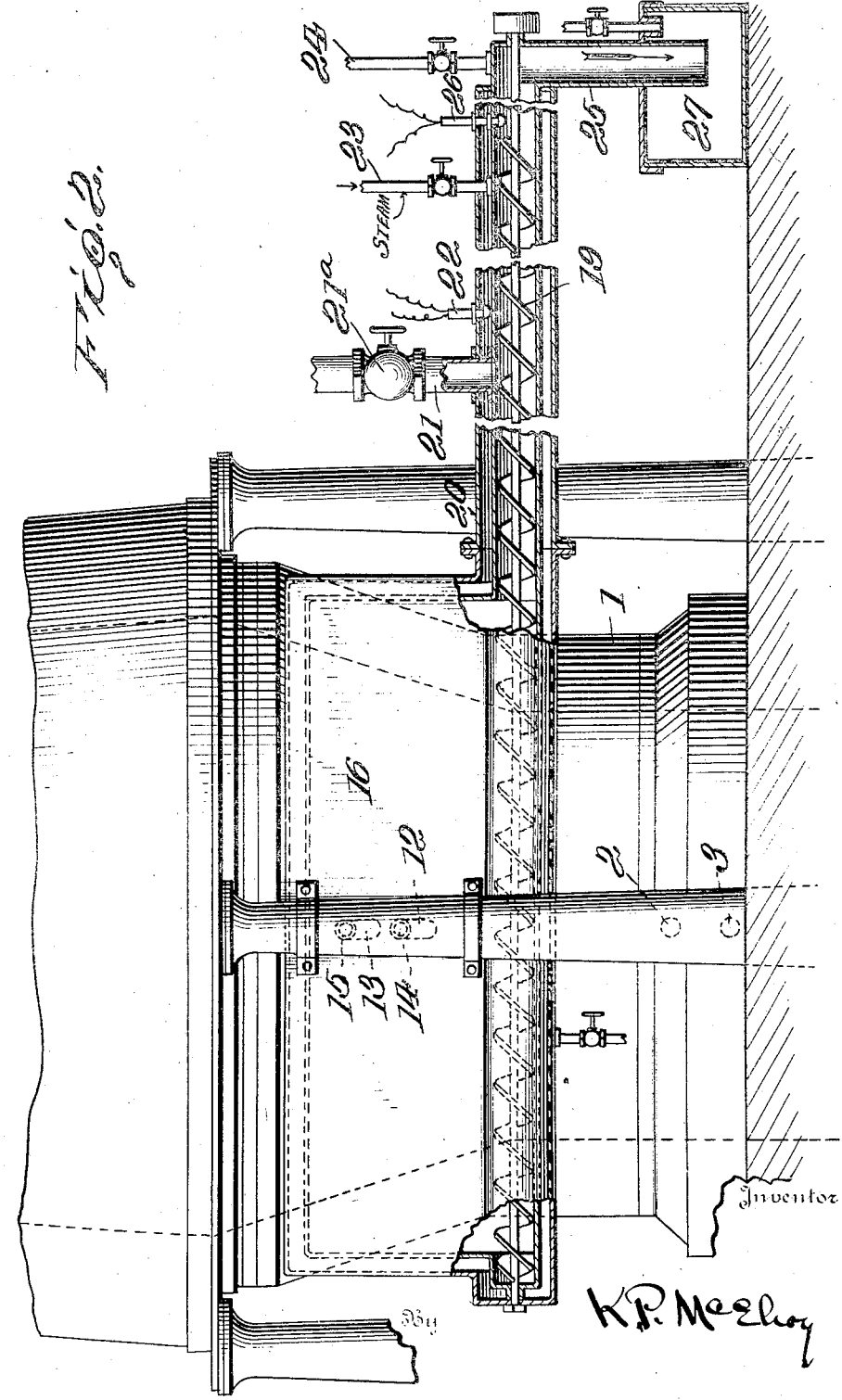

Patented Aug. 28, 1923.

1,466,626

UNITED STATES PATENT OFFICE.

KARL P. McELROY, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

PRODUCTION OF AMMONIA AND SALTS OF CERTAIN CARBON ACIDS.

Application filed July 8, 1921. Serial No. 483,160.

*To all whom it may concern:*

Be it known that I, KARL POMERY MC-ELROY, a citizen of the United States, residing at Washington, in the District of Columbia, have invented certain new and useful Improvements in the Production of Ammonia and Salts of Certain Carbon Acids, of which the following is a specification.

This invention relates to the production of ammonia and salts of certain carbon acids; and it comprises a method of fixing atmospheric nitrogen and producing ammonia and such salts wherein a shaft furnace such as a blast furnace for making iron or ferro alloy or a slagging gas producer is charged with a mixture of coal, coke or charcoal, lime or limestone, iron or other ore and soda or sodium compounds, and the charge is blown with a blast of highly heated air under conditions producing an intensely hot zone of combustion with formation of molten slag, molten iron and a gas substantially free of carbon dioxid and carrying in substantial concentration vapors or fumes of sodium cyanid, a regulated proportion of such hot gas being tapped off at the intensely hot zone and somewhat cooled to separate and condense cyanid containing material and the separated material, being hydrolyzed or steamed to produce ammonia and sodium formate oxalate and/or carbonate and it also comprises the combination of a blast furnace or the like provided with a pair of vertically spaced apertures in the furnace walls at the hot zone with a closed casing having lateral openings adapted to fit against and seal with the side of said furnace at the points of aperture, water cooling means for said casing, conveyor means adapted to remove and cool solids from said casing and steaming means for treating removed solids prior to complete cooling, said steaming means being provided with an outlet for ammonia and gases, said combination of apparatus including means for regulating the relative proportions of the gases produced in the hot zone of the furnace passing upward through the shaft on the one hand and out through said side casing on the other hand; all as more fully hereinafter set forth and as claimed.

In conjunction with one Arthur C. Spencer, I have described and claimed in Patent No. 1,156,108 a process of producing potassium cyanid with the aid of potash derived from natural silicates and nitrogen from the air wherein a furnace of the type of a blast furnace or slagging gas producer is charged with a mixture of such silicates, lime or limestone, iron ore and fuel and is air blown with a hot air blast. Under these conditions, molten iron and molten slag are produced, as is usual in such furnaces and in addition there is a development of potassium cyanid which may be recovered in various ways; one such way being to tap off gases containing cyanid fumes or vapors from the hotter zones of the furnace and cool to condense the cyanid. In another application, Serial No. 208,647, (Patent No. 1,390,533) I have described a similar process wherein the necessary potash is derived in whole or in part from returned potash; the cyanid produced being steamed to form and set free ammonia. In the invention of said application, potassiferous silicates may also be used in amounts sufficient to make up losses of potash in the operation. In said application I have also described a modification of my invention wherein in lieu of using potash as the alkali for producing cyanid, soda may be so used. In using soda, replenishment for losses in the operation may be with commercial carbonate of soda. Part of the alkali used in making cyanid may be potash and part soda. In another application, Serial No. 477,205, I have described and claimed a process and apparatus wherein a descending mass comprising alkali compounds and carbon is preheated and contacted under gas producing conditions with preheated air, an adjusted proportion of the gases thereby produced and carrying substantial concentrations of cyanid vapor being passed upward in counter current to said descending mass, preheating it for the combustion zone, and material containing cyanid being separated from another portion of said gases, the regulation being such as to establish and maintain in the hot zone of the furnace a dominant pool of cyanid in the liquid and vapor phases. In a described modification of the invention of said application Serial No. 477,205 sodium compounds may be used to supply the alkali for making cyanid. As pointed out in said application, when practicing the invention in a blast furnace making iron, the material separated from the gases carries, in addition to dust from the furnace charge, other nitrogen compounds beside cyanid. It is however convenient for present purposes to call the material separated and condensed from the gases, "cyanid". The production of ammonia from this material is disclosed but not claimed in said application. This material contains a high proportion of nitrogen in combined forms including cyanids; the nitrogen compounds being disseminated through other material constituting the dust carried by the furnace gases. The deposited material because of its structure is readily pervious to steam and easily susceptible of ammonification.

The present invention relates in part to said modified invention of Patent No. 1,390,533 wherein soda, or a mixture of soda and potash, is used in lieu of potash in the process of said patent. In part it relates to said modified invention of application Serial No. 477,205 and in part it relates to a method of producing ammonia with formates, oxalates and carbonates or caustic alkali and their derivatives, as useful by-products of blast furnaces making iron and ferroalloys.

In the present invention a blast furnace or slagging gas producer is provided with the usual blast means, charging means, slag outlet, metal outlet and gas offtake and it is in addition provided with gas outlet from the furnace at the hotter zone and with means for controlling the volume of gas withdrawn therethrough. Hot blast is used in order to obtain a maximum temperature in this zone and a supply of heat available for work at high temperatures. The charge consists of coke or coal, soda or sodium compounds, metallic iron, iron ore or ore for making ferro alloy and enough lime, limestone or other flux to slag the ash of the fuel and the impurities of the ores. Part or all of the lime may be replaced by calcium phosphate to give an easily fusible ferrophosphorus. If the charge does not give a substantial amount of slag, it is desirable to add some, or to charge in a little potassiferous rock. The presence of iron is desirable, because of certain catalytic properties possessed by the metal but the process may be operated without metal production. Gas passes upward through the charge in the manner usual in blast furnaces and gas producers to be drawn off at a high point (as in the usual downcomer) while gas is, in substantial amount, also withdrawn at another level, that of the hot zone. The relative proportions of gas withdrawn at the two points may be of course as desired, and may be adjusted as described in the application Serial No. 477,205 above referred to.

In a furnace such as described under the influence of the blast a rich producer gas substantially free of $CO_2$ is formed near the tuyères; this gas being at a very high temperature; a temperature of say 1400 to 1500° C. Sodium cyanid is also formed from nitrogen of the air blast, possibly with an intermediate formation of metallic sodium; and at this temperature it has sufficient vapor tension to occur as vapor in substantial concentration in the hot gases produced in the combustion zone. Near the tuyères cyanid may be burnt to a greater or less extent with temporary formation of sodium carbonate vapor, which is subsequently reconverted to cyanid in contact with incandescent carbon in the presence of the nitrogen of the air. Above the hot zone cyanid condenses in the charge and is also broken up, oxidized sodium compounds returning to the hot zone to be recyanided. After the furnace has been running for a little time, a certain maximum concentration of cyanid occurs in the hot zone and any excess may find exit either downward as molten cyanid overlying the slag.

In this invention, hot gases containing cyanid are tapped off from the hot zone in sufficient amount to maintain the concentration below the point where any substantial amount of the soda supplied to the furnace goes off as dust of decomposed cyanid (sodium carbonate mostly) with the top gases or downward reaching the slag bath. By careful regulation of the proportion of gas so tapped off, I establish and maintain in the hot zone of the furnace a dominant mass or, so to speak, pool of cyanid in the liquid and vapor phases, feeding soda to this pool and withdrawing sodium cyanid vapor in the hot gases, the amount of cyanid so withdrawn being substantially equivalent to the feed of soda, which latter is proportioned in accordance with the supply of heat available at the temperature of the combustion zone. This available heat is directly proportional to the blast temperature, so that, the greater the blast heat, other things being equal, the greater is the possible concentration of cyanid vapor in the combustion gases and the greater may be the yield of cyanid through the withdrawal of a given volume of gas from the hot zone. With a given blast temperature and a given proportion of soda in the charge, regulation depends upon the proportion of the hot gases allowed to ascend through the shaft. All the energy absorbed in the combustion zone in forming and vaporizing cyanid is contained in the cyanid vapor in the combustion gases and to the extent that these gases go up through the shaft this energy becomes applicable to work in the shaft by condensation and decomposition of cyanid. The same is true of the energy carried as sensible heat as well as reducing energy of the combustion gases CO and $N_2$. Hence it follows that the amount of gas withdrawn from the hot zone may determine the amount of the net energy put into the furnace and the variation of such gas withdrawal affords a means of control of the furnace operation by coordination of the energy input with variations in the work to be done. By this variation or regulation the operation may be made smooth and regular and relatively high efficiency in the use of fuel may be attained. The temperature and $CO_2$ ratio in the top gas are measures of the degree of utilization of the fuel energy in the furnace. I may adjust the withdrawal of gas so that the top temperature is not over 200° C. and the $CO_2$ ratio to CO not less than 50:50, increasing the proportion of gas withdrawn at the bottom when the top temperature rises and $CO_2$ ratio falls and vice-versa. The hot gases tapped off at the hot zone are quieted and cooled somewhat to deposit cyanid, the cooling not always being to ordinary temperature. The material containing deposited cyanid is next steamed. This steaming may, according to conditions produce formates, oxalates or carbonates.

At temperatures below 200° C. alkali cyanid reacts with $H_2O$ to form formate; from 200° to 450° C. oxalate is formed and above 450° the alkali goes quite largely to carbonate. Nitrogen of the cyanids is converted to ammonia in all three cases. By regulation of the temperature at which the cyanid taken out of the furnace is treated with steam, either formate, oxalate or carbonate may be produced as desired in addition to ammonia. In the present invention, therefor, the hot collected cyanid is cooled to such a temperature that on contact with $H_2O$ the temperature of the mass will be such as to cause the formation of the product desired. If formate alone is required, the hot cyanid may be placed in a vessel such as an autoclave heated by convenient means, water added and the mass digested at from 150 to 200° until ammonia ceases to be evolved, the ammonia being led off by usual means and the formate solution evaporated and cooled for recovery of the dry salt. If oxalate be required the exact temperature to which the collected cyanid is cooled of course depends upon the temperature of the steam used; but ordinarily using superheated steam I cool to about 500° C. and I usually have the proportion of cyanid, relative to the steam, in excess of the theoretical proportion, because oxalate tends to be converted to carbonate in the presence of steam with evolution of $CO_2$ and $H_2$. If carbonate alone is required, hot cyanid is treated with a small stream of hot water in quantity such as to maintain the temperature from 500 to 600°.

In any case the ammonia produced in the hydrolyzing or steaming of the cyanid is collected in any of the ordinary ways. Sometimes it may be desirable to produce formate, oxalate and carbonate together and in this case I cool the hot collected cyanid gradually while passing it by a suitable conveyor in counter-current to a carefully regulated volume of steam which first contacts with cyanid partially converted to carbonate oxalate and formate and at a temperature conducive to formate formation, not over 200°; as the steam meets the counter-current of hot cyanid at a gradually rising temperature, formate, oxalate and carbonate, depending upon the temperature and the relative amount of steam used, are formed in varying proportions. The hot cyanid cooled to about 500° meets a current of steam and ammonia together with $H_2$, CO and $CO_2$, the concentration of steam increasing and the temperature gradually dropping as the cyanid proceeds in counter-current to the gases. Carbonate and oxalate are first formed and below 200°, formate. Any residual cyanid may be converted to formate by hydrolysis of the steamed material in an autoclave or pressure digester. From the solution of sodium formate, oxalate and carbonate, so obtained, oxalate on account of its relatively low solubility is first deposited on evaporation and cooling. Or, the dry mixture of carbonate, oxalate, formate and residual cyanid may be leached with a limited quantity of water, whereupon sodium oxalate remains undissolved. The leachings may then be digested as heretofore described to complete the hydrolyzing of cyanid to formate and ammonia. The solution containing sodium formate and carbonate may be treated with ammonia and $CO_2$ to precipitate sodium bicarbonate, leaving ammonium formate in solution and this may be treated with inorganic acids to produce ammonium salts and formic acid, thereby realizing a double utilization of the inorganic acid. The sodium bicarbonate may be utilized in the usual ways or it may be calcined to soda ash and $CO_2$. The soda, or part of it, may be returned to the furnace. The formic acid may be utilized as desired or it may be converted into zinc formate or other heavy metal formate from which formaldehyde and methyl alcohol are obtained by heating to about 250°, with recovery of the metallic oxid. Sodium oxalate may be purified by recrystallization and it may be treated with lime to convert it to calcium oxalate from which oxalic acid is made in well known ways. The caustic soda given by treatment of sodium oxalate with lime may be sent back to the furnace or otherwise utilized.

Where the charge in the furnace contains potassium compounds and also sodium compounds (either naturally present or added thereto) both alkalies appear as cyanids and can be converted into formates, oxalates and carbonates. On leaching the material containing oxalates with a limited quantity of water in the way stated, the potassium compounds go into solution, leaving sodium oxalate behind. This offers a convenient method of separating sodium compounds from potassium compounds. The potassium compounds in the leachings may go back to the furnace; or they may be recovered and otherwise disposed of.

As the fuel supplied for the operation I may use coke or charcoal. The latter imports a little alkali (potash) as well as considerable lime into the charge. I may also however use any ordinary coal.

As stated, I use a vertical shaft air-blown at the bottom and charged at the top, and pass a proportion of the hot gases upward through the mass. The soda may be added in the form of ordinary soda ash or other sodium salts such as common salt or sodium chlorid. Sodium sulfate could be used but it would import sulfur. Soda bearing silicate rock is suitable as a source of soda, as well as sodium aluminates, silicates or combinations thereof. Solutions of recovered soda from the operation may be sprinkled on the coal or coke. In using fine coal or fine ores the soda solutions may be used as a bricketing binder. In producing slag, if the fuel and iron ore do not furnish a sufficient amount, an addition of a little potassiferous silicate such as feldspar, glauconite, etc., is desirable. Potash is thus obtained as a by-product. The amount of flux in the charge should be sufficient to give a slag no more acid than ordinary iron slag. With such a slag and a sufficiently high temperature very little of the alkali will go into the slag.

In the accompanying illustration I have shown, more or less diagrammatically, certain apparatus elements within the present invention and adapted for use in the performance of the described process. In this showing—

Figure 1 is a vertical section of a shaft furnace of the usual type and may be taken as representing either a slagging gas producer or an ordinary blast furnace such as is employed in the manufacture of iron, and Figure 2 is a vertical section, certain parts being shown in elevation.

In this showing element 1 is the crucible or hearth of the furnace and is provided with the usual slag outlet 2, iron outlet 3 and tuyères 4 fed from bustle pipe 5. Above the crucible is the bosh 6 advantageously cooled in the usual manner by elements 7. Above the bosh is the shaft of the furnace 8 supported on piers or pillars 9. At the top of the furnace are charging device 10 and gas outlet 11 leading to the usual downcomer (not shown) employed in blast furnaces. As so far described the structure is that of an ordinary blast furnace or slagging gas producer, the latter being merely a blast furnace on a smaller scale. Unlike these structures, however, the bosh is provided with a pair of vertically spaced apertures 12 and 13. Registering with these apertures are two apertures, respectively 14 and 15, in a side casing 16, shown as double walled and intended for cooling with either water or steam. Manhole 17 is provided for access. As shown the casing is of such dimension and shape as to allow it to fit between the bosh wall and the supporting pillars, being secured to the latter. The structure as a whole is arranged tangentially to the furnace. At its bottom it is provided with a converging bottom, forming trough 18 in which is a conveyor 19 which may be water cooled if desired. This conveyor is best made of heat refractory metals such as the high speed steels. Beyond the casing (see Figure 2) the conveyor extends into a water cooled conduit 20 provided with gas outlet 21, pyrometer 22 and steaming connection 23. Beyond this steaming connection is another outlet for gas and ammonia 24. The steamed material is delivered into outlet conduit 25 which may deliver into a closed tank or autoclave 27. There may be several of the casings at different points around the furnace. The casing may be annularly continuous around the furnace with low points for collection and removal of cyanid. The level at which the outlets from the furnace are placed may be above the bosh.

In the use of the above structure, hot vapor laden gases flow into the pocket 16 through 12 and deposit much or most of their cyanid with dust and other material and, lightened in density thereby, they flow back into the furnace through 13. This flow is materially assisted by the fact of the pressure differential between 12 and 13, located at different heights in the furnace. In effect, 16 offers an unobstructed by-pass through which gases tend to flow. The chamber 16 taps what may be called a dominant pool of cyanid vapors and fumes in the furnace and with proper control of the alkali charge, very little of the alkali fed to the furnace reaches the gas outlet 11. Some fraction of the hot gases going into chamber 16 may pass outward through conduit 20 and outlets 21 and 24. If alkali tends to appear in the dust at 11 the flow of gas through 21 may be increased or the supply of alkali somewhat diminished. It is in general the object to have the material coming past 22 at such a temperature that the addition of steam at 23 will cause the formation of the desired proportions of formate, oxalate and carbonate and pyrometer 26 will indicate the temperature and aid control. The ammonia evolved in the operation may be recovered in any of the usual ways from the mixture of gas, steam and ammonia going to exit at 24 and 21. The disposition of the material passing through 25 has already been described. Control of the gas flow through the shaft of the furnace is secured by adjustment of valves 11ª and 21ª as well as by the speed of conveyor 19.

The present process is particularly valuable in its application to iron ores high in sulfur since much of the sulfur is withdrawn from the blast furnace with the cyanid fumes. In practicing the present process with such ores a higher grade iron is obtained than can be made without the addition of alkali and withdrawal of fumes. In such practice, however, care must be taken with regard to the return of recovered alkali to prevent return of sulfur to the blast furnace. For example, in running a blast furnace with high-sulfur ore and soda, fuming off cyanids (and sulfur compounds) and converting the cyanids to oxalates, it is usually inexpedient to return mother liquors from the crystallization of sodium oxalate though the soda obtained by treating the oxalate with lime may be so returned.

In making an oxalate under the present invention, it is ordinarily converted into calcium oxalate preparatory to the formation of oxalic acid with sulfuric acid in the usual way. This fact lends itself to a convenient method of producing caustic alkali. If, for example, the furnace is fed with a charge containing potassiferous silicates, potassium cyanid is formed and this is steamed in the manner described is converted into a dry mass of potassium oxalate. On breaking up this dry material with milk of lime, insoluble calcium oxalate is formed and a solution of caustic potash is produced. From this solution caustic potash may be regained in the usual way. If the furnace is charged with sodium carbonate, similarly caustic soda may be obtained from the steamed cyanid. As caustic soda is commercially more valuable than carbonate, in some embodiments of my invention I do not return any of the recovered alkali but supply the furnace with sodium carbonate and market the caustic soda formed from the oxalate. Any carbonate of alkali which may occur in the steamed cyanid is also converted into caustic alkali by the lime. In condensing the cyanid in the casing electric precipitation may be used to accelerate condensation, or in the casing may be placed charcoal or coke which aids in the removal by adsorption of cyanid from the furnace gases, molten cyanid dripping from the adsorptive medium.

The invention furnishes a method of obtaining alkali from common salt by charging a small proportion thereof with the materials used in making iron in a blast furnace. Sodium chlorid reacts with lime, silica, iron oxid, etc., in the furnace shaft and its sodium reaches the hearth as $Na_2O$ free or combined; if sufficient lime be present in the charge, very little soda leaves the furnace in the slag, most of it being converted to cyanid vapor which leaves the furnace as herein described. Hydrolysis or steaming of the cyanid as described completes the conversion of sodium chlorid to formate, oxalate, or carbonate, with production of ammonia.

This application is a continuation in part of application Serial No. 281,916 filed March 11, 1919 and it contains matter described but not claimed in application Serial No. 477,205 filed June 13, 1921. In the present application, I have described and claimed a process of making iron with production of ammonia as a byproduct wherein soda or sodium chlorid (as the case may be) is charged with the furnace materials, gases withdrawn under certain conditions, material (including cyanids) carried by the withdrawn gases collected therefrom and this solid material steamed to produce ammonia and a residue containing sodium compounds. These sodium compounds may be returned to the furnace, the sodium thereby serving cyclically; or they may be otherwise utilized. In the ammonia forming step of my process steaming in a certain way to produce oxalates (or formates) with or without carbonates is often advantageous, for reasons hereinbefore pointed out; but this special manner of procedure is not necessary in my main invention and I do not claim it herein, it forming the matter of another and copending divisional application.

What I claim is:—

1. In nitrogen fixation the process which comprises charging into a blast furnace making iron or ferro-alloy sodium compounds with fuel, flux and ore, maintaining by aid of a high blast heat a temperature in the hearth sufficient to form freely running molten slag and metal and a substantial concentration of cyanid vapor in the gases produced in the hearth, removing a regulated proportion of such gases from the furnace through outlet provided in the hot zone, separating from the removed gases material containing sodium cyanid and steaming the separated material to produce ammonia.

2. In nitrogen fixation the process which comprises charging into a blast furnace making iron or ferro-alloy sodium compounds with fuel, flux and ore, maintaining by aid of a high blast heat a temperature in the hearth sufficient to form freely running molten slag and metal and a substantial concentration of cyanid vapor in the gases produced in the hearth, removing a regulated proportion of such gases from the furnace through outlet provided in the hot zone, separating from the removed gases material containing sodium cyanid and steaming the separated material at a temperature between 400° and 500° C.

3. In nitrogen fixation the process which comprises charging into a blast furnace making iron or ferro-alloy sodium compounds with fuel, flux and ore, maintaining by aid of a high blast heat a temperature in the hearth sufficient to form freely running molten slag and metal and a substantial concentration of cyanid vapor in the gases produced in the hearth, removing a regulated proportion of such gases from the furnace through outlet provided in the hot zone, separating from the removed gases material containing cyanid, steaming the separated material to produce ammonia, recovering soda from the steamed material and returning recovered soda to the furnace charge.

4. In nitrogen fixation the process which comprises charging into a blast furnace making iron or ferro-alloy sodium compounds with fuel, flux and ore, maintaining by aid of a high blast heat a temperature in the hearth sufficient to form freely running molten slag and metal and a substantial concentration of cyanid vapor in the gases produced in the hearth, removing a regulated proportion of such gases from the furnace through outlet provided in the hot zone, separating from the removed gases material containing cyanid, steaming the separated material at a temperature between 400° and 500° C., recovering soda from the steamed material and returning recovered soda to the furnace charge.

5. In the production of ammonia from atmospheric nitrogen primarily fixed as cyanid, the process which comprises withdrawing from the hot zone of a blast furnace making iron a certain proportion of the cyanid-vapor-laden gases produced in the hearth while adding to the furnace charge a correlated proportion of sodium compounds, collecting cyanid-bearing material from the withdrawn gases, steaming the collected material and recovering sodium salts from the steamed material.

6. The process of fixing nitrogen as ammonia which comprises contacting at a slagging temperature an ignited mixture of carbonaceous fuel and sodium compounds with highly heated air to form cyanid-vapor-laden producer gas, collecting cyanid bearing material from a regulated proportion of such producer gas and steaming the collected material to produce ammonia.

7. In the fixation of nitrogen as ammonia the cyclic process which comprises contacting carbon and soda with air at a temperature above 1000°, separating sodium carbonitrogenous compounds from the resulting gases and treating the separated product with $H_2O$ to produce ammonia and reproduce soda; all in closed cycle as regards soda.

8. In ammonia manufacture the process which comprises steaming nitrogenous material deposited from a portion of the hot vapor laden gases produced in blowing highly heated air into contact in the presence of preformed cyanid with carbon and alkali preheated by counter current contact with a portion of such vapor-laden gases previously produced, the relative proportions of the respective portions of the vapor laden gases being so adjusted in relation to the proportion of alkali with the carbon that a substantial concentration of cyanid vapor is maintained in the gases.

9. In the operation of a furnace of the type of a blast furnace blown with highly heated air and producing molten slag and molten metal, the process of fixing nitrogen of the air blast and obtaining as a byproduct such fixed nitrogen in the form of ammonia which comprises adding alkali compounds to the usual blast furnace charge, withdrawing a regulated proportion of the furnace gases at a level of high temperature, separating cyanid-containing-material from the hot gases and steaming the separated material at a temperature between 400° and 500° C.

10. In nitrogen fixation the process which comprises air-blowing a mixture of carbon and soda at a temperature around 1400° C to form cyanid vapor, removing a portion of the cyanid laden gases produced, separating sodium cyanid from such removed gases in a heated state, cooling the separated cyanid to a temperature around 500° and steaming such partly cooled cyanid at a temperature between 400° and 500° C.

11. In nitrogen fixation the process which comprises air-blowing a mixture of carbon and alkali at a temperature around 1400° C. to form cyanid vapor, removing a portion of the cyanid laden gases produced, separating alkali metal cyanid from such removed gases in a heated state, cooling the separated cyanid to a temperature around 500° and steaming such partly cooled cyanid at a temperature between 400° and 500° C.

12. In nitrogen fixation the process which comprises adding sodium compounds to the materials charged into a blast furnace making iron, withdrawing a correlated proportion of the furnace gases through outlet provided in the hot zone, cooling and quieting the withdrawn gases to deposit solid material containing dust from the furnace charge with condensed nitrogen compounds and steaming the deposited material to produce ammonia.

13. In the fixation of nitrogen as cyanid by means of a blast furnace making iron by aid of hot blast with subsequent conversion to ammonia of nitrogen so fixed through hydrolysis of cyanid withdrawn in gases from the hot zone of the furnace the process characterized by the fact that the fuel economy of the furnace is improved and controlled by adding alkali to the charge in a proportion correlated with the proportion of the cyanid-vapor-laden gases produced in the hearth which is withdrawn from the furnace at the hot zone.

14. In the operation of a blast furnace making iron or ferro-alloy, the process of obtaining ammonia and salts of carbon acids as byproducts which comprises charging sodium chlorid with ore, flux and fuel, maintaining by the aid of a high blast heat a substantial concentration of cyanid vapor in the gases of the hot zone, withdrawing from the furnace at the hot zone a regulated portion of such gases, separating cyanid-bearing material from the hot gases and hydrolyzing the separated material.

15. The process of making ammonia and sodium salts of carbon acids which comprises charging into a blast furnace making iron sodium chlorid with ore, flux and fuel, blowing the ignited charge in the hearth with a blast of heated air, withdrawing from the furnace at a level of high temperature a regulated portion of the gases produced in the hearth, separating from the withdrawn gases material containing cyanid and steaming the separated material at a temperature between 400° and 500° C.

16. In nitrogen fixation, the process which comprises feeding the top of a furnace of the type of a blast furnace with a charge comprising carbonaceous fuel, flux and sodium compounds, blowing highly heated air at the base and withdrawing a regulated proportion of the combustion gases, carrying a substantial concentration of cyanid vapor, from the furnace at the hot zone, said regulated proportion of the gases so withdrawn being sufficient to remove from the furnace sodium cyanid in amount substantially equivalent to the sodium compound fed at the top.

17. In the fixation of nitrogen as cyanid by air-blowing a mass of carbon and sodium compound at a slagging temperature, the continuous process which comprises maintaining by aid of a high blast heat a substantial concentration of sodium cyanid vapor in the gases produced, removing a portion of such gases to separate sodium cyanid therefrom and preheating carbon and soda with another portion of such gases proportioned in correlation with the mass of carbon and sodium compounds.

18. In nitrogen fixation the process which comprises establishing and maintaining in a suitable reaction chamber a dominant mass or pool of sodium cyanid, in the liquid and vapor phases, in contact with carbon and feeding soda and carbon to said pool while supplying heat thereto with the aid of the combustion of a part of said carbon to CO by preheated air and removing cyanid vapor.

19. In the fixation of nitrogen in a blast furnace by gasifying carbon with alkali and with air, forming cyanid vapor for subsequent conversion to ammonia of nitrogen so fixed, the process of developing in the hearth a volume of heat available for the cyanid forming reaction which comprises maintaining a high blast heat, adding a correlated proportion of alkali to the materials charged into the furnace, preheating said materials by countercurrent contact in the furnace shaft with a correlated proportion of the cyanid-laden gases produced in the hearth, withdrawing another portion of such gases from the furnace through outlet provided in the hot zone and separating therefrom cyanid containing material.

20. The method of regulating the operation of a blast furnace producing cyanids from air by means of the withdrawal of substantial volumes of cyanid laden gases from the furnace at the hot zone which comprises increasing the volume of gas so withdrawn upon rise of the top temparature of the furnace and decreasing the volume of gas withdrawn upon fall of said top temperature.

21. In nitrogen fixation the process which comprises heating in a blast furnace a mass containing carbon and sodium compounds with aid of the combustion of said carbon by preheated air and withdrawing cyanid laden gases from the furnace at the hot zone, the volume of gases so withdrawn being adjusted in such proportion relative to the total volume of gases produced in said hot zone that the temperature of the gases leaving the top of the furnace is not over 200° C. and the volume ratio of $CO_2$ to CO in said top gases is not les than 50:50.

22. In the operation of a blast furnace for the fixation of nitrogen and smelting of iron or ferro-alloy the process which comprises charging sodium compounds with ore, flux and carbonaceous fuel into the furnace, maintaining by the aid of a high blast heat a temperature in the hearth sufficient to form freely running molten slag and metal and withal a substantial concentration of cyanid vapor in the gases produced in the hearth, removing a correlated proportion of such gases from the furnace through outlet provided in the hot zone and cooling and quieting the removed gases to separate therefrom solid material containing nitrogen compounds.

23. In the operation of a furnace of the type of a blast furnace, blown with heated air and producing molten slag and molten metal the process of fixing as cyanid a substantial proportion of the air nitrogen which comprises adding sodium compounds to the charge in quantity sufficient to cause a substantial concentration of sodium cyanid vapor in the gases of the hot zone, supplying heat to the blast sufficient to maintain such concentration, withdrawing a correlated portion of such gases from the furnace and cooling the withdrawn gases to deposit and separate sodium cyanid therefrom.

24. In the operation of a blast furnace making iron or ferro-alloy with a hot blast the process of fixing and recovering a portion of the nitrogen of the air blast which comprises charging sodium chlorid with the materials at the top, withdrawing a correlated proportion of the furnace gases through outlet provided in the hot zone and separating sodium cyanid from the withdrawn gases.

25. In the gasification in a blast furnace at a slagging temperature of carbonaceous fuel by a blast of heated air the process which comprises withdrawing gases from the hotter zone of the furnace and charging a sodium compound at the top, the amount of the hot gases so withdrawn being sufficient to prevent any substantial proportion of the soda equivalent of the sodium compound so charged leaving the furnace as fume in the top gases escaping from the furnace.

26. In the operation of a furnace of the type of a blast furnace producing molten iron and molten slag and supplied with the usual blast furnace charge and also with alkali, the process which comprises establishing and maintaining a convectional bypass circulation of fume-laden gases from the interior of the furnace through a cooled side-chamber and collecting and removing condensed cyanid from said chamber.

27. In nitrogen-fixing apparatus the combination of a blast furnace or the like provided with the usual charging inlet, molten metal outlet, slag outlet and gas outlet and also provided with a pair of vertically spaced apertures in the hot zone and an accessory cyanid collecting chamber having apertures connected and sealing with said apertures in the furnace and means for removing solids deposited in said chamber.

28. In a nitrogen fixing apparatus the combination of a blast furnace or the like provided with the usual charging inlet, molten metal outlet, slag outlet and gas outlet and also provided with a pair of apertures in the hot zone and an accessory cyanid collecting chamber having apertures registering and sealing with said apertures in the furnace and mechanical conveying means in said chamber to remove solids deposited therein.

29. In a nitrogen fixing apparatus the combination with a blast furnace or the like provided with the usual charging inlet, molten metal outlet, slag outlet and gas outlet and also provided with a pair of apertures in the hot zone, of an accessory cyanid collecting chamber having apertures registering and sealing with said apertures in the furnace, a screw conveyor within said chamber and extending therefrom, a water jacketed casing surrounding this extension, means for regulating the gas flow through said casing, means for introducing steam into the extension and means for removing ammonia therefrom.

In testimony whereof, I have hereunto affixed my signature.

K. P. McELROY.